March 26, 1957 — O. MEYER — 2,786,219
DEVICE FOR THE INTRODUCTION, REMOVAL, AND
DETENTION OF A PIPELINE SCRAPER
Filed July 10, 1953
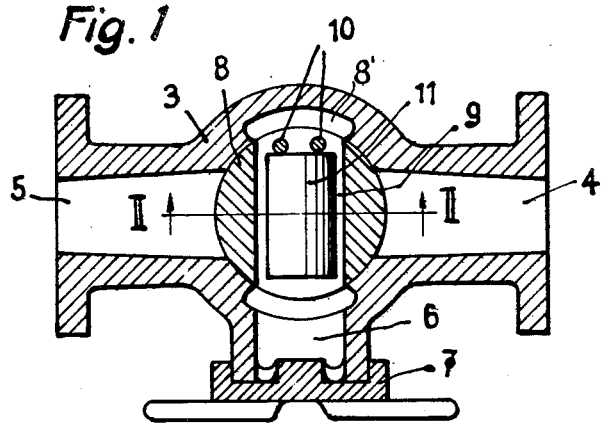
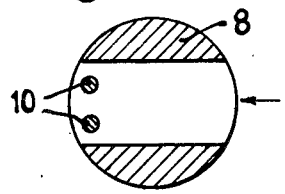 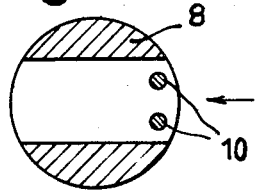
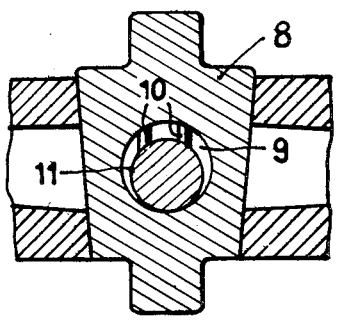
OTTO MEYER
BY:

United States Patent Office 2,786,219
Patented Mar. 26, 1957

2,786,219

DEVICE FOR THE INTRODUCTION, REMOVAL, AND DETENTION OF A PIPELINE SCRAPER

Otto Meyer, Ehlershausen, near Lehrte, Germany, assignor to Cosmopolitan A. G., Basel, Switzerland, a Swiss company Application July 10, 1953, Serial No. 367,285

Claims priority, application Germany July 11, 1952

2 Claims. (Cl. 15—104.06)

In pipes serving for the flow of a fluid that is liable to form a deposit, there is a risk of a gradual closing of the cross-sectional area. This is the case in particular for pipelines feeding mineral oils which are likely to form, on the inner wall of the pipeline, a deposit of paraffin wax separating from the oil. Tube scrapers or wipers are consequently introduced at predetermined time intervals into the pipeline for freeing the latter of such deposits. This scraper, constituted by a cylindrical body of paraffin wax and additions, is moved through the actual tube under the action of the very flow of the fluid fed through the pipe.

The introduction and removal of the scraper required hitherto a great expenditure in auxiliary arrangements and led to substantial losses of the fluid fed through the pipeline. Up to this day, it has been necessary to provide, at the point of introduction and of removal of the scraper, a branch pipe and also stopping means adapted to cut off the flow of material through the main pipe and through the branch pipe together with further stopping means for the connection and disconnection of the branch pipe with the outside. The service of such stopping means took much time, and the unavoidable loss of fluid at each opening of the branch pipe rose to a figure as high as 20 litres e. g. in certain mineral oil concerns.

My invention removes these drawbacks and provides a fitting to be inserted inside the main pipe and consequently by no means in a special branch pipe, said fitting being adapted to receive and hold the scraper while allowing the fluid to continue flowing freely through the pipe and providing, furthermore, ready means for the removal and the introduction of the scraper and also for letting it progress through the pipe or holding it in a stationary position therein.

The chief feature of my invention consists in that the said fitting contains means for holding fast the scraper engaging it, said arrangement being controlled from outside so as to release the scraper when operated. These scraper-holding means include, a grating which may be rotated so as to release the scaper engaging it. The grating is fitted inside a cock plug bore the inner diameter of which is larger than the cross-section of the scraper so that the fluid flowing through the pipe may continue flowing through the cock even in the case of a scraper being carried inside said plug. Furthermore, the casing of said cock forming my improved fitting includes a further passage in addition to the standard input and output connections said further passage serving for the introduction and removal of the scraper into and out of the pipe.

I have illustrated by way of example in accompanying drawings a preferred embodiment of the object of my invention. In said drawings:

Fig. 1 shows my improved fitting in axial medial cross-sectional view;

Figs. 1a and 1b show the plug of the fitting in two different positions;

Fig. 2 is a view of the fitting through the section line II—II of Fig. 1.

The casing 3 of the fitting includes an input passage 4 and an output passage 5 together with a lateral passage 6. The input and output passages are aligned and open into the two sections of the pipe separated by the fitting. The lateral passage 6 is closed by the cover 7 which is preferably designed so that it may be removed and re-inserted by hand without any wrench being required. Inside a cylindrical chamber 8' of the casing 3 is rotatably mounted a rotary plug 8 the transverse bore 9 of which is large enough for the fluid to pass through it even when the scraper is located inside said bore, said scraper being constituted, as mentioned, by a cylindrical body or cake of paraffin with its additions. The two passages 4 and 5 are flared from the actual pipe sections to the ends intersecting the chamber 8'. The bore in the plug is provided near one of its ends with transverse pins 10 forming a grating. When the plug is in the angular position illustrated in Fig. 1a, the scraper carried along by the stream of fluid is arrested by the transverse pins 10. The fluid flowing through the pipe in the direction of the arrow is however allowed to continue its progress over said arrested scraper. If the scraper inside the plug 8 is to be released and consequently allowed to continue flowing with the fluid, the plug is brought into the position illustrated in Fig. 1b. At this moment the transverse pins 10 do not hold the scraper back any longer.

When the scraper is to be removed from or introduced into the plug, the plug is turned into the position illustrated in Fig. 1 so that the passages 4 and 5 are closed while the cover 7 is removed from the lateral passage 6. The loss of fluid, fed by the pipe, caused by the removal of the cover 7 is so small as to be negligible during the time required for introducing or removing the scraper. In contradistinction with known arrangements wherein three stopping means have to be controlled, my invention requires only one control member to be operated, to wit, the plug 8 while the speedily actuated cover 7 is removed and replaced.

What I claim is:

1. In a pipeline through which a cylindrical scraper is adapted to be fed periodically by the fluid passing through the pipeline and including at least two pipe sections, the combination of a valve casing fitted between two sections of the pipeline and provided with a central cylindrical chamber and with two aligned passages flaring inwardly from the outer ends of the casing registering with the pipe sections towards said central chamber, said valve casing further provided with a third passage opening into the central chamber and the diameter of which is larger than that of the cylindrical scraper, a cover removably fitted over the outer end of said third connection, a plug rotatably mounted in said cylindrical chamber and provided with a transverse bore registering at two predetermined angular diametrically opposed locations with the pipe sections, the cross section of said bore being larger throughout than the cross-section of the cylindrical scraper allowing the fluid to flow through the plug over the scraper when present therein, said plug bore registering at a further angular location of the plug with the third connection for removal and introduction of the scraper through the latter, means carried by the plug extending across the bore in the latter for arresting the scraper in the bore in the plug at a predetermined angular setting of the plug in the casing at which the plug bore is aligned with the pipe sections and to release the scraper at the diametrically opposed position, and means for controlling said plug from the outside of the pipeline.

2. A device for the introduction, removal and detention of a cylindrical scraper in a pipeline comprising a valve casing having a chamber therein and a passageway through said casing intersecting said chamber, said passageway being larger at the intersection with the chamber than at the ends, and tapering gradually from the chamber to the ends, said chamber further having an outlet passage therefrom transverse to said passageway and the same size as said passageway at the intersection of said chamber, a plug rotatably mounted in said chamber having a bore therethrough the same size as said passageway at the intersection of said chamber and aligned with said passageway in one position of said plug and with the outlet passage in another position of said plug, a grating across said bore at one end thereof adjacent the periphery of the plug, whereby when the cylindrical scraper is passed through a pipe line in which said device is positioned, the plug and grating arrest the cylindrical scraper and it may be removed by turning the plug so that the bore is aligned with the outlet passage.

References Cited in the file of this patent

UNITED STATES PATENTS

| | | |
|---|---|---|
| 973,794 | Lightcap | Oct. 25, 1910 |
| 1,006,260 | Mueller et al. | Oct. 17, 1911 |
| 1,175,328 | Wright | Mar. 14, 1916 |
| 2,015,567 | Lowry | Sept. 24, 1935 |
| 2,058,825 | Rallet et al. | Oct. 27, 1936 |
| 2,184,393 | Luccous | Dec. 26, 1939 |

FOREIGN PATENTS

| | | |
|---|---|---|
| 28,866 | Netherlands | Jan. 16, 1933 |
| 262,639 | Switzerland | Oct. 1, 1949 |